United States Patent
Tan et al.

(10) Patent No.: US 7,477,809 B1
(45) Date of Patent: Jan. 13, 2009

(54) PHOTONIC GUIDING DEVICE

(75) Inventors: Michael Renne Ty Tan, Menlo Park, CA (US); Alexandre M. Bratkovski, Mountain View, CA (US); Shih-Yuan (SY) Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/831,555

(22) Filed: Jul. 31, 2007

(51) Int. Cl.
*G02B 6/12* (2006.01)
*G02B 6/10* (2006.01)
*G02B 6/00* (2006.01)

(52) U.S. Cl. .......................... 385/14; 385/50; 385/125; 385/131; 385/132; 385/133; 385/146

(58) Field of Classification Search ........... 385/14, 385/50, 125, 129–133, 146
See application file for complete search history.

(56) References Cited

U.S. PATENT DOCUMENTS

| | | |
|---|---|---|
| 4,688,892 A | 8/1987 | Laakmann |
| 4,688,893 A | 8/1987 | Laakmann |
| 5,379,354 A | 1/1995 | Jenkins |
| 5,396,570 A | 3/1995 | Jenkins et al. |
| 5,525,190 A | 6/1996 | Wojnarowski et al. |
| 5,562,838 A | 10/1996 | Wojnarowski et al. |
| 5,737,458 A | 4/1998 | Wojnarowski et al. |
| 5,815,627 A | 9/1998 | Harrington |
| 6,982,419 B2 | 1/2006 | Shimada et al. |
| 2003/0205065 A1 | 11/2003 | Matsuura et al. |
| 2005/0089262 A1* | 4/2005 | Jenkins et al. ............. 385/14 |
| 2006/0171626 A1 | 8/2006 | McNie et al. |
| 2006/0177177 A1* | 8/2006 | Jenkins et al. ............. 385/33 |
| 2007/0081255 A1 | 4/2007 | Cianciotto et al. |

OTHER PUBLICATIONS

Marcatili, et al., "Hollow Metallic and Dielectric Waveguides for Long Distance Optical Transmission and Lasers", The Bell System Technical Journal, Jul. 1964, pp. 1783-1809.
Mohebbi, et al., "Silver-coated hollow-glass waveguide for applications at 800 nm" Applied Optics, Nov. 20, 2002, vol. 41, No. 33, pp. 7031 to 7035.

* cited by examiner

*Primary Examiner*—Sung H Pak
*Assistant Examiner*—Daniel Petkovsek

(57) ABSTRACT

A photonic guiding device and methods of making and using are disclosed. The photonic guiding device comprises a large core hollow waveguide configured to interconnect electronic circuitry on a circuit board. A reflective coating covers an interior of the hollow waveguide to provide a high reflectivity to enable light to be reflected from a surface of the reflective coating. A collimator is configured to collimate multi-mode coherent light directed into the hollow waveguide.

12 Claims, 5 Drawing Sheets

PHOTONIC GUIDING DEVICE

BACKGROUND

As computer chip speeds on circuit boards increase to ever faster speeds, a communications bottleneck in inter-chip communication is becoming a larger problem. One likely solution is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes. Optical interconnects between chips have therefore proven illusive, despite the need for broadband data transfer.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
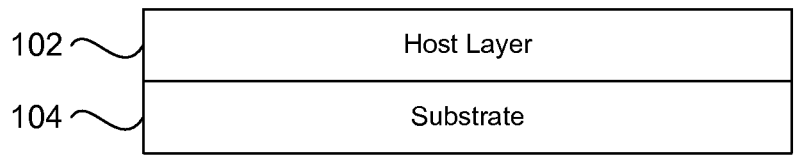
FIG. 1a is an illustration of a host layer carried by a substrate in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

One method for forming optical interconnects between computer chips on a circuit board is to use optical waveguides formed on the circuit board. Optical waveguides can be superior to fiber optic communications because of the ability to form the waveguides on the circuit board using lithographic or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board. For example, optical waveguide (s) may be formed on a flexible substrate to create a ribbon cable having one or more optical waveguides. The optical waveguides disclosed in this application are formed on substrates using lithographic or similar processes.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, polymer waveguides can have losses that are orders of magnitude greater than the loss in fiber optics.

In addition, typical waveguides are usually manufactured to have dimensions that are roughly proportional with the wavelength of light they are designed to carry. For example, a single mode waveguide configured to carry 1000 nm light may have a dimension of 1000 nm to 5000 nm (1 μm to 5 μm) for the higher index core region and surrounded by a lower index cladding region. Multimode waveguides may have larger dimensions on the order of 20-60 um for the core region. Both single and multimode waveguides have a relatively high numerical aperture (NA) of around 0.2 to 0.3 for a core and clad refractive index contrast of 0.01 to 0.02. The numerical aperture determines the divergence of beam from the emitting fiber. Thus, a larger NA will result in poor coupling as a function of fiber to fiber separation. Thus, connecting waveguides of this size can be expensive and challenging.

Splitting and tapping of the guided optical beams are also difficult to accomplish using these waveguides. The cost of creating and connecting waveguides has historically reduced their use in most common applications. In accordance with one aspect of the invention, it has been recognized that an inexpensive photonic guiding device is needed that is simpler to interconnect with other waveguides and optical devices and that can significantly reduce the amount of loss in an optical waveguide.

In accordance with an embodiment of the present invention, FIGS. 1a through 1e provide an illustration of a method of making a photonic guiding device. This optical waveguide is comprised of a hollow core with a high reflective cladding layer. It operates on the principle of attenuated total internal reflection different from conventional optical waveguides which rely on total internal reflection at the critical angle formed between the core and clad of the waveguide. FIG. 1a shows a host layer 102 being carried by a substrate 104. The substrate may be comprised of a variety of different types of materials. For example, the substrate may be a flexible material such as plastic or a printed circuit board material. The circuit board material can be configured to be rigid or flexible. Alternatively, the substrate may be formed of a semiconductor material.

Figure 1B:
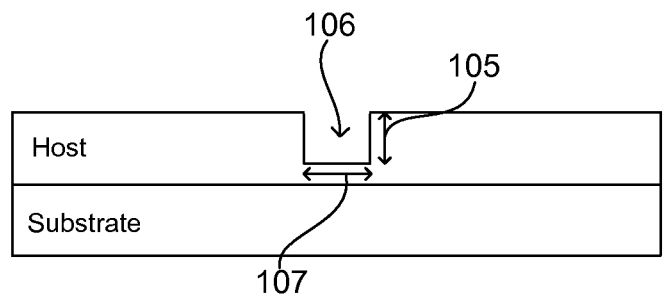
FIG. 1b illustrates a channel formed in the host layer of FIG. 1a in accordance with an embodiment of the present invention.
Figure 1C:
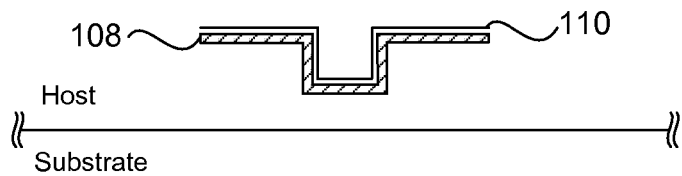
FIG. 1c illustrates a reflective coating and protective layer applied over the channel of FIG. 1b to form a base portion in accordance with an embodiment of the present invention.

The host layer 102 can be formed on top of the substrate material. The host layer may also be a type of flexible material such as a polymer or a semiconductor material to enable the material to be processed using standard lithographic processes. A channel 106 can be formed in the host layer, as shown in FIG. 1b. For example, a dry etching process may be used to form the channel. Alternatively, a molding or stamping process may be used. The shape of the channel can be rectangular, square, circular, or some other geometry used to efficiently transmit coherent light. The height 105 and/or width 107 of the channel can be substantially greater than a wavelength of the coherent light that is directed in the photonic guiding device. For example, the height or width may be 50 to over 100 times greater than the wavelength of the coherent light.

To facilitate a reduction in scattering of the coherent light within the photonic guiding device, the walls of the channel can be smoothed to reduce or eliminate roughness. Ideally, any extruding features along the walls should be less than a wavelength of the coherent light. The walls of the channel can be smoothed using a heat reflow process. This process entails heating the host and substrate material to a temperature that would enable irregular rough features left over from etching or stamping the channel to be substantially reduced or eliminated. The temperature at which the heat reflow process is optimal is dependent on the type of material used to form the host 102 and substrate 104 layers.

In order to increase the reflectivity within the channel, a reflective coating 108 (FIG. 1c) may be added to cover an interior of the channel 106 in the host layer 102. The reflective coating can be formed using a plating, sputtering, or similar process, as can be appreciated. If the host material 102 comprises a polymer or other material with a low melting point, the reflective coating may be applied using a low temperature process such as electroplating, sputtering or thermal evaporation.

The reflective coating 108 can be comprised of one or more layers of metals, dielectrics, or other materials that are substantially reflective at the wavelength of the coherent light. The metals can be selected based on their reflectivity. A highly reflective layer covering the channel is desired. For example, the reflective layer may be formed using silver, gold, aluminum, platinum, or some other metal or alloy that can form the highly reflective layer. An adhesion layer such as titanium may also be used to help the adhesion of the reflective metal to the host material 102. Alternatively, the reflective layer may be a dielectric stack which can be formed from one or more layers of dielectric material that is substantially reflective at a selected wavelength. The reflective layer may also undergo a heat reflow or similar process to smooth rough anomalies in the reflective layer that may occur during the deposition process. Electro-polishing may also be used to yield a smooth mirror finish.

If the photonic guiding device is not protected, the reflective coating 108 may oxidize over time. Oxidation of the reflective coating can substantially reduce its reflectivity. To reduce or eliminate degradation of the metal coating's reflectivity, a protective layer 110 can be formed over the reflective coating to act as a sealant. The protective layer can comprise a material that is substantially transparent at the wavelength of the coherent light. For example, the protective layer can be formed of silicon dioxide or some other material that can form a substantially air tight bond over the reflective coating. Moreover, the thickness and index of the coating layer is chosen so as to further reduce the propagation loss in the waveguide by separating the light beam from the more lossy metal layer.

Figure 1D:
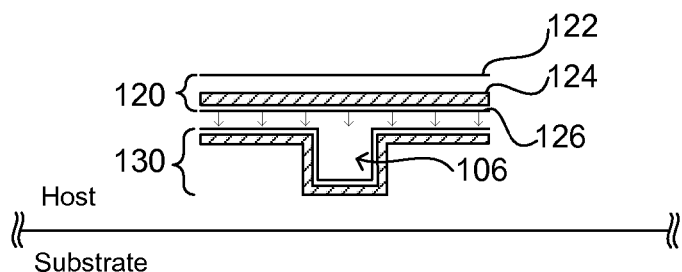
FIG. 1d illustrates a lid portion having a reflective coating and a protective layer in accordance with an embodiment of the present invention

The channel 106, reflective coating 108, and protective layer 110 can form a base portion 130 of the photonic guiding device, as shown in FIG. 1d. A lid portion 120 can be formed of a cover material 122 that is layered with a reflective coating 124 and a protective layer 126 configured to protect the reflective coating on the lid portion from oxidizing. The reflective coating and the protective layer can be formed using the same materials as previously discussed in the base portion. Alternatively, different materials may be used based on desired properties of the lid portion.

The cover material can be formed of a material configured to receive the reflective coating and the protective layer. A flexible material may be selected that will allow the photonic guiding device to be flexible. For example, the photonic guiding device may be formed as a ribbon cable that can be used to interconnect electronic or optical devices.

Figure 1E:
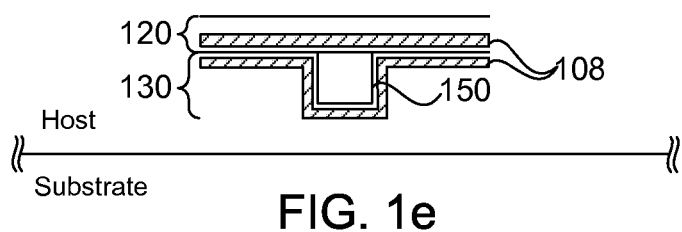
FIG. 1e illustrates the lid portion coupled to the base portion of FIG. 1c in accordance with an embodiment of the present invention.

After the lid portion 120 has been formed, the lid portion can be laminated or bonded to the base portion 130, as illustrated in FIG. 1e. When the lid portion is bonded to the base portion, a large core hollow waveguide 150 is formed. The large core hollow waveguide has a reflective coating 108 covering an interior of the hollow waveguide. The reflective coating enables light to be reflected from a surface of the metal coating to reduce attenuation of laser light as it is directed through the waveguide.

Figure 2A:
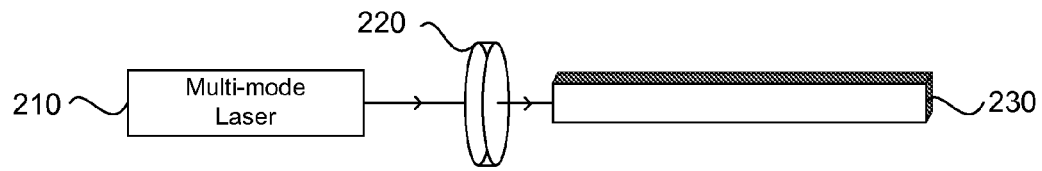
FIG. 2a illustrates a block diagram of a photonic guiding device in accordance with an embodiment of the present invention.

FIG. 2a illustrates a block diagram of a photonic guiding device. The photonic guiding device can be coupled to a multi-mode laser 210. Single mode lasers can be substantially more expensive than multi-mode lasers. Thus, using a multi-mode laser can substantially reduce the cost of the overall system. One drawback of using a multi-mode laser, however, is that a significant portion of the laser light may be emitted from the laser at fairly large angles relative to a direction the light is emitted. The higher the mode of the laser light, the greater the angle that it is emitted from the laser. Light that is emitted at a large angle will reflect more often within the large core hollow waveguide 230. The greater the number of reflections, the more the light will be attenuated within the waveguide. Thus, higher modes may be substantially attenuated within the waveguide.

Hollow waveguides having reflective surfaces operate differently than solid waveguides. Hollow waveguides guide light through reflection from the reflective layer(s) and not through total internal reflection, as typically occurs in solid waveguides such as an optical fiber. The light within the hollow waveguide may be reflected at an angle less than what is necessary for total internal reflection, as can be appreciated.

For a circular hollow waveguide, the $TE_{01}$ mode has an attenuation per unit length that can be determined according to equation 1:

$$\alpha_c = \frac{R_S}{a\eta} \cdot \frac{\left(\frac{\omega_c}{\omega}\right)^2}{\sqrt{1 - \left(\frac{\omega_c}{\omega}\right)^2}}, \qquad (1)$$

where a is the waveguide radius, $\omega$ is the frequency of the light in radians, $\omega_c$ is the $TE_{01}$ cut-off frequency, $\delta$ is the depth of penetration of the light into the metal, $\mu$ is the permeability, and $\eta$ is the impedance of free space. This attenuation is due to the finite conductivity of the metal walls. $R_s$ is the surface resistivity of the metal and is given by:

$$R_s = \frac{1}{\sigma\delta} = \sqrt{\frac{\pi f \mu}{\sigma}}, \quad (2)$$

where $\sigma$ is the conductivity and f is frequency of light. It can be seen that $R_s$ increases as the square root of f.

From equation (1) above, it can be seen that the attenuation for the $TE_{01}$ mode decreases with increasing frequency. The decrease in attenuation at increasing frequencies occurs because the mode is not coupled to the guide walls at high frequencies. Other modes may couple to the waveguide walls and can attenuate the $TE_{01}$ mode at waveguide bends and discontinuities due to mode conversion.

To overcome the attenuation of the higher modes emitted from the multi-mode laser 210, a collimator 220 can be placed within a path of the laser beam from the multi-mode laser. The collimator can be a collimating lens such as a ball lens with an anti-reflective coating. The collimator is configured to collimate the multi-mode beam emitted from the laser into a parallel beam before it enters the large core hollow waveguide 230. In this way, the beam just grazes the reflective layer suffering only a few bounces as it propagates within the waveguide. The collimator provides that substantially any reflections that do occur will typically be at a relatively shallow angle with respect to the waveguide walls, thus minimizing the number of reflections within the waveguide and therefore reducing the attenuation of the light within the hollow waveguide. As a result, the low loss mode propagating in the hollow waveguide has an extremely small numerical aperture. This property allows the insertion of optical splitters into these waveguides with little excess loss.

For example, a multimode coherent beam of 850 nm light can be transmitted through the large core waveguide having a reflective coating with a loss on the order of 0.07 dB/cm. The losses of the waveguide can scale with its size. Smaller size waveguides can have higher losses due to the greater number of internal reflections (bounces) in the waveguide. Thus, larger waveguides may be used to reduce loss.

Larger waveguides, on the order of 50 micrometers ($\mu$m) to 250 $\mu$m are easier and less costly to connect due to the higher tolerances of the large waveguides. Use of a collimating lens to direct multi-mode coherent light through the large core waveguide can also substantially reduce the cost of the overall photonic guiding device. Multimode lasers are significantly less expensive than their single mode counterparts.

Accordingly, the photonic guiding device comprising a large core hollow waveguide with internal reflective surfaces that is coupled to a collimator configured to collimate multi-mode coherent light directed into the waveguide can serve as a relatively inexpensive, low loss means for interconnecting components on one or more printed circuit boards. The low loss of the guiding device enables the device to be more commonly used in commodity products, such as interconnecting electronic circuitry optically.

Electronic circuitry can include electrical circuitry, wherein electrical signals transmitted from the circuitry are converted to optical signals and vice versa. Electronic circuitry can also include optical circuitry that can communicate directly using optical signals without a need for conversion. The electronic circuitry may be contained on a single circuit board. Alternatively, the electronic circuitry may be located on two or more separate circuit boards, and the waveguide can be used to interconnect the boards. It is also relatively easy to tap and direct the optical signals from these waveguides through the use of a tilted semi-reflecting surface. This is rather difficult for conventional waveguides to achieve due to the larger numerical aperture of conventional waveguides.

Figure 2B:
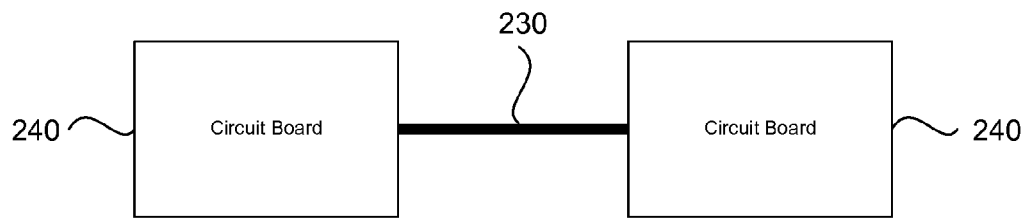
FIG. 2b illustrates a large core hollow waveguide used to interconnect two circuit boards in accordance with an embodiment of the present invention.

For example, FIG. 2b shows a large core hollow waveguide 230 with internal reflective surfaces. The hollow waveguide is used to couple two circuit boards 240. The larger waveguide can reduce the cost of interconnecting the waveguide between the boards, as previously discussed. The reflective surfaces within the waveguide can reduce loss, enabling a low power signal of coherent light to be transmitted through the waveguide to the adjoining circuit board. An inexpensive multi-mode laser, located on one or both of the circuit boards, can be used to transmit the coherent light. A collimating lens can be included on one or both of the circuit boards and optically coupled to the waveguide. The collimating lens can reduce the losses of higher modes of light caused by multiple reflections. The hollow waveguide 230 interconnect may be configured to be coupled between the boards in a manufacturing process. Alternatively, the hollow waveguide may be formed as a connector and/or cable that can be connected to the boards after they are manufactured.

Figure 2C:
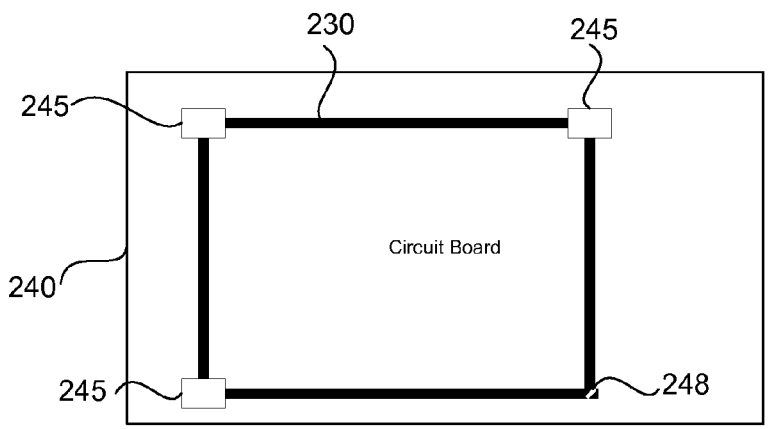
FIG. 2c illustrates a large core hollow waveguide used to interconnect electronic components on a circuit board in accordance with an embodiment of the present invention.
Figure 2D:
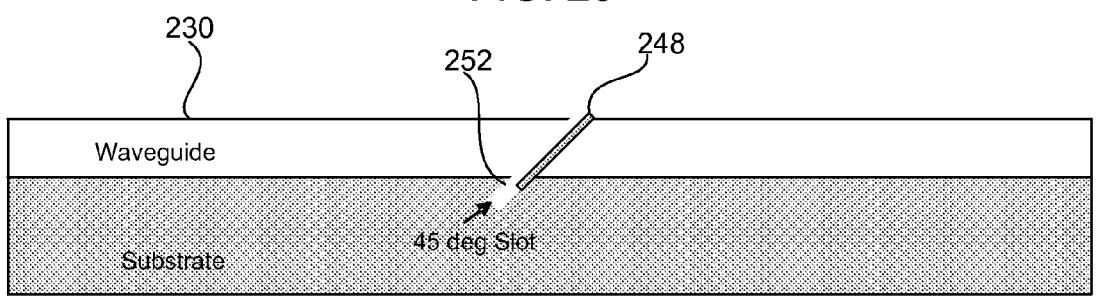
FIG. 2d illustrates a large core hollow waveguide with a slot cut at a predetermined angle to enable a redirecting device to be inserted into the slot in accordance with an embodiment of the present invention.

The hollow waveguide 230 with internal reflective surfaces may also be used to interconnect electronic components 245 on a single circuit board 240, as shown in FIG. 2c. An electronic component may be used to redirect the light from one waveguide to another. Alternatively, ninety degree turns are relatively easy to achieve by inserting a redirecting device 248 at an angle of approximately 45 degrees from the beam. A slot 252 may be cut in the hollow waveguide 230 using, for example, a dicing saw, as shown in FIG. 2d. The slot may continue into the substrate to provide added structural support to attach the redirecting device. The redirecting device may be coupled to the waveguide using adhesive. The redirecting device may be a mirror, as can be appreciated. Alternatively, an optical beam splitter, an aperture, a semi transparent mirror, a diffractive grating, or a scatterer or similar type of optical device may also be used in place of the mirror if only a portion of the light is desired to be redirected.

Figure 3A:
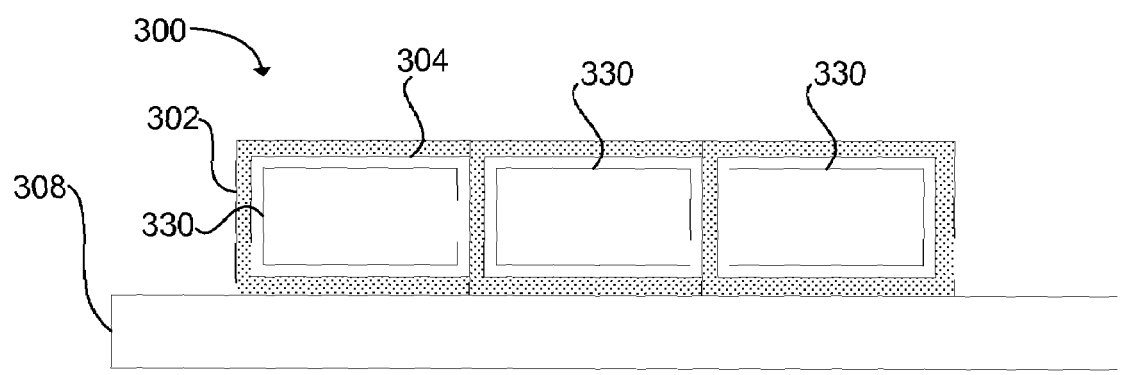
FIG. 3a illustrates a one dimensional array of large core hollow waveguides having a reflective coating and a protective layer in accordance with an embodiment of the present invention.

The large core waveguides can also be formed in an array to enable multiple signals to be directed. For example, FIG. 3a illustrates a one dimensional array 300 of hollow waveguides 330. Each waveguide can be surrounded by a reflective material 302, as previously discussed. The reflective material can be coated with a protective 304 to reduce oxidation. The array of waveguides can be constructed on a substrate or host material 308.

Figure 3B:
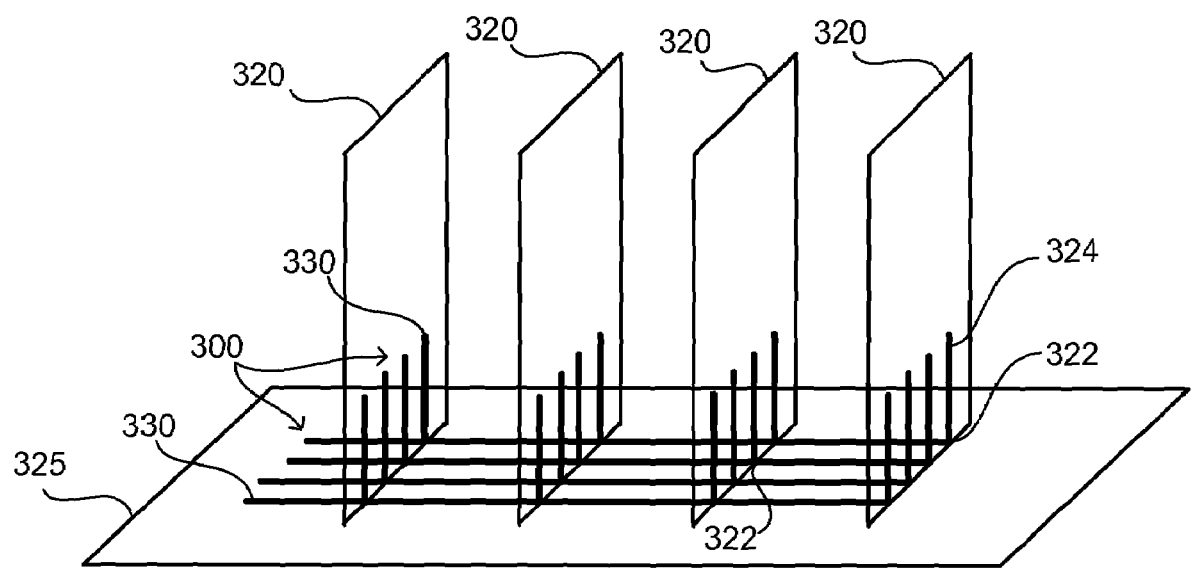
FIG. 3b illustrates a three dimensional array of large core hollow waveguides having a reflective coating and a protective layer in accordance with an embodiment of the present invention.

FIG. 3b illustrates an array 300 of hollow waveguides 330 coupled to a circuit board. The circuit board can act as the substrate 308 to which each hollow waveguide in the array can be attached. In one embodiment, the circuit board can be configured as an optical backplane 325. Multi-mode coherent light can be directed into each of the waveguides using a collimator, as previously discussed. A coupling device 322, such as an optical splitter, can be configured to direct at least a portion of the guided multi-mode coherent light beam out of the waveguide at a selected location. Ideally, the optical splitters must be thin enough so as to prevent the beam from walking off. For example, a 200 $\mu$m thick beam splitter can result in a beam walk-off of about 60 $\mu$m. This walk-off will result in higher propagation loss. Beam walk-off can be reduced by using beam splitters with a shorter optical path, such as a splitter that is approximately 5 µm thick, which will result in a walk-off of less than 1.5 µm. Thus splitters that are less than 25 µm thick are preferred. The beam splitter(s) can be inserted by forming a slot in the hollow waveguide, as previously discussed and illustrated in FIG. 2d. For example, as shown in FIG. 3b, the coupling device can be used to redirect at least a portion of the coherent light in the hollow waveguide to an optically coupled large core hollow waveguide 324 that is outside the plane of the circuit board. The optically coupled waveguide may be orthogonal to the backplane, although substantially any angle may be used.

Redirecting the multi-mode coherent light out of the plane of the circuit board can enable a plurality of circuit cards, such as daughter boards 320, to be optically coupled to a backplane 325. High data rate information that is encoded on the coherent light signal can be redirected or distributed from the backplane to the plurality of daughter boards.

The large core hollow waveguides with a reflective interior coating enable transmission of high data rate information to a plurality of different boards. The low loss of the hollow waveguides enables a single optical signal to be routed into multiple other waveguides, as shown in FIG. 3b. The multi-mode coherent light beam that is guided through each waveguide can carry data at a rate of tens of gigabits per second or higher. The light beam essentially propagates at the speed of light since the index of the mode is nearly unity, resulting in a substantially minimal propagation delay. The optical interconnects enabled by the hollow waveguides provide an inexpensive means for substantially increasing throughput between chips and circuit boards.

Figure 4:
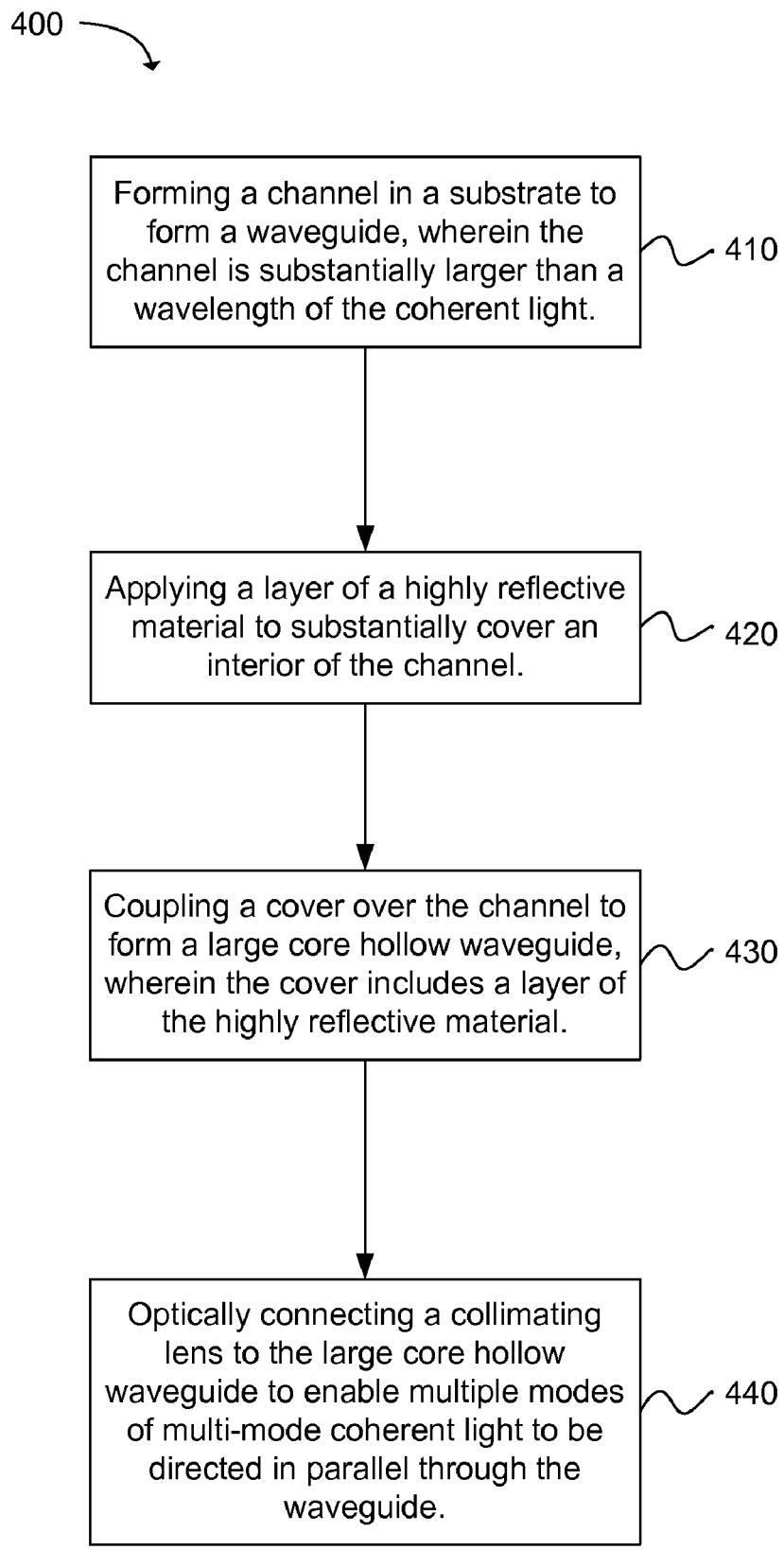
FIG. 4 is a flow chart depicting a method for making a photonic guiding device for directing coherent light in accordance with an embodiment of the present invention.

Another embodiment provides method 400 for making a photonic guiding device for directing coherent light, as illustrated in the flow chart in FIG. 4. The method includes the operation of forming 410 a channel in a substrate to form a waveguide configured to interconnect electronic circuitry on a circuit board. The channel has at least one of a width and a height that is substantially larger than a wavelength of the coherent light. The electronic circuitry may be located on a single circuit board, or on separate circuit boards. The channel formed in the substrate has a height and/or width that is substantially larger than a wavelength of the coherent light. The relatively large size of the waveguide allows the light to be directed through the waveguide using the properties of reflection rather than total internal reflection, as previously discussed. The channel can be formed to have any desired shape. For example, the channel may have a cross sectional shape that is square or rectangular. Certain shapes, such as circular or elliptical, may provide less loss due to multiple reflections. The channel can be etched or stamped into the substrate. The substrate can be formed of materials such as polymers or semiconducting material. The substrate may be a layer of a printed circuit board. The substrate may also be a host material located on a printed circuit board.

A further operation in the method 400 provides applying 420 a layer of a highly reflective material to substantially cover an interior of the channel. The reflective material can be selected based on its reflective properties, as previously discussed. An additional operation provides coupling 430 a cover over the channel to form a large core hollow waveguide, wherein the cover includes a layer of the highly reflective material. A protective layer may also be added over the reflective material to reduce oxidation.

An additional operation includes optically connecting 440 a collimating lens to the large core hollow waveguide to enable multiple modes of multi-mode coherent light to be directed in a parallel beam through the waveguide. Directing the multiple modes in parallel through the waveguide excites the lowest loss mode in the waveguide.

Figure 5:
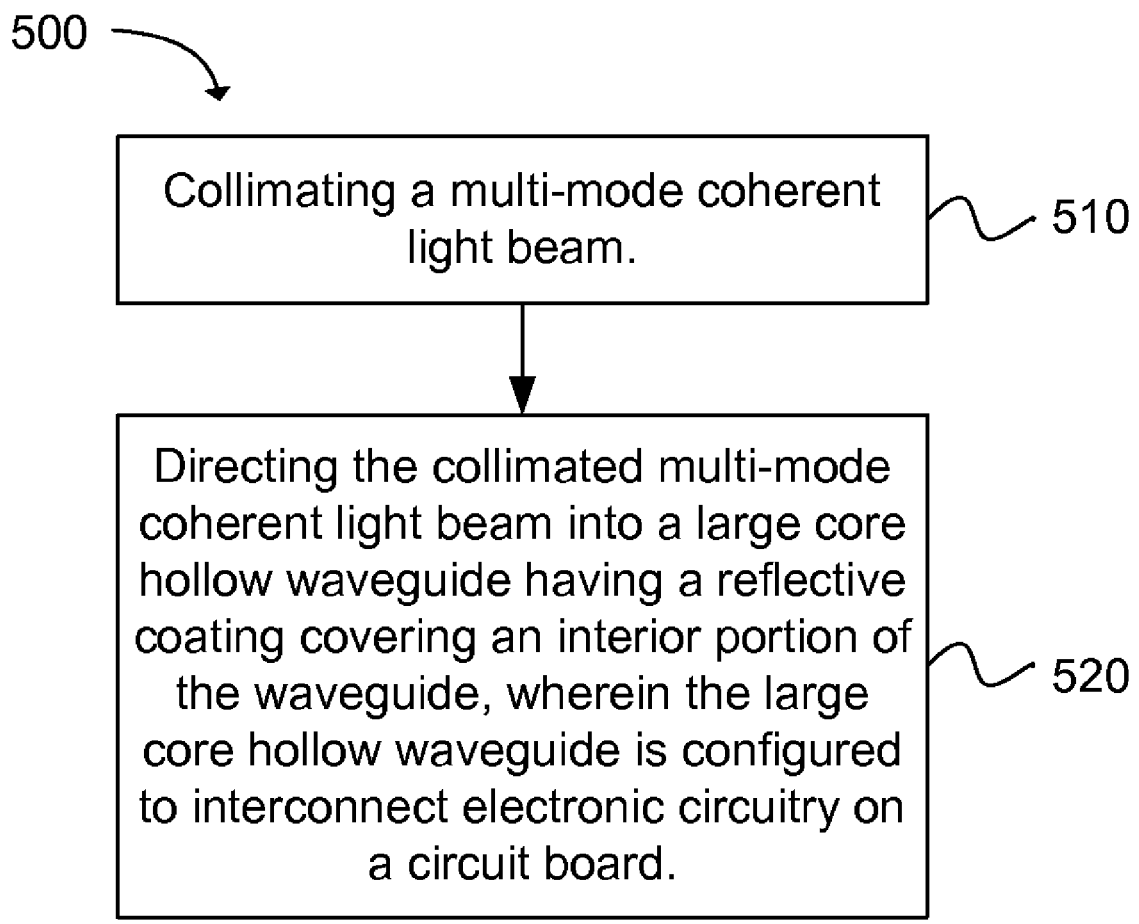
FIG. 5 is a flow chart depicting a method for guiding an optical beam in accordance with an embodiment of the present invention.

Another embodiment of the present invention provides a method 500 for guiding an optical beam, as illustrated in the flowchart of FIG. 5. The method includes the operation of collimating 510 a multi-mode coherent light beam. The beam may be collimated using a collimating lens. An additional operation provides directing 520 the collimated multi-mode coherent light beam into a large core hollow waveguide having a reflective coating covering an interior portion of the waveguide. The large core hollow waveguide is configured to interconnect electronic circuitry on a circuit board. Collimating the multi-mode beam enables a plurality of the modes emitted by a multi-mode laser to be directed through the hollow waveguide with a substantially reduced amount of loss due to multiple reflections.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A photonic guiding system, comprising:
    a large core hollow waveguide coupled to a circuit board located in a plane;
    a reflective coating covering an interior of the hollow waveguide, wherein the reflective coating provides a high reflectivity to enable light to be reflected from a surface of the reflective coating;
    a protective layer applied over the reflective coating to substantially reduce oxidation of the reflective coating, wherein the protective layer is substantially transparent at a wavelength of the coherent light; and
    a collimator configured to collimate a multi-mode coherent light beam directed into the hollow waveguide to enable the multi-mode coherent light beam to be guided through the hollow waveguide with a reduced number of reflections of the multi-mode coherent light inside the hollow waveguide to decrease loss of the multi-mode coherent light beam through the waveguide.

2. A photonic guiding system as in claim 1, further comprising a coupling device configured to direct at least a portion of the guided multi-mode coherent light beam to an optically coupled large core hollow waveguide that is outside the plane of the circuit board.

3. A photonic guiding system as in claim 2, wherein the coupling device is selected from a group consisting of an optical beam splitter, an aperture, a semi transparent mirror, a diffractive grating, or a scatterer.

4. A photonic guiding system as in claim 1, wherein the coherent light has a wavelength of less than 900 nanometers.

5. A photonic guiding system as in claim 1, further comprising a multi-mode laser configured to provide multi-mode coherent light to be directed into the hollow waveguide.

6. A photonic guiding system as in claim 1, wherein the large core hollow waveguide has a cross-sectional shape selected from the group consisting of square, rectangular, circular, and elliptical.

7. A photonic guiding system as in claim 1, wherein the reflective coating is comprised of one or more metal layers.

8. A photonic guiding system as in claim 1, wherein the reflective coating is a dielectric stack comprised of one or more dielectric layers.

9. A photonic guiding system as in claim 1, wherein the large core hollow waveguide is configured to interconnect electronic circuitry located on at least two separate circuit boards.

10. A photonic guiding system as in claim 1, wherein the large core hollow waveguide is configured to interconnect electronic circuitry located on a single circuit board.

11. A photonic guiding system as in claim 1, further comprising an array of large core hollow waveguides configured to direct multi-mode coherent light.

12. A photonic guiding system as in claim 1, wherein the photonic guiding device creates a loss of less than 0.1 dB/cm as the coherent light passes through the large core waveguide.

* * * * *

UNITED STATES PATENT AND TRADEMARK OFFICE
CERTIFICATE OF CORRECTION

PATENT NO. : 7,477,809 B1
APPLICATION NO. : 11/831555
DATED : January 13, 2009
INVENTOR(S) : Michael Renne Ty Tan et al.

It is certified that error appears in the above-identified patent and that said Letters Patent is hereby corrected as shown below:

In column 4, line 62, in equation 1, delete " $\frac{R_5}{a\eta}$ " and insert -- $\frac{R_s}{a\eta}$ --, therefor.

Signed and Sealed this

Fourteenth Day of July, 2009

JOHN DOLL
*Acting Director of the United States Patent and Trademark Office*